Dec. 1, 1931.  H. W. SANFORD ET AL  1,834,035
JOURNAL BOX AND AXLE
Original Filed April 27, 1927   4 Sheets-Sheet 2

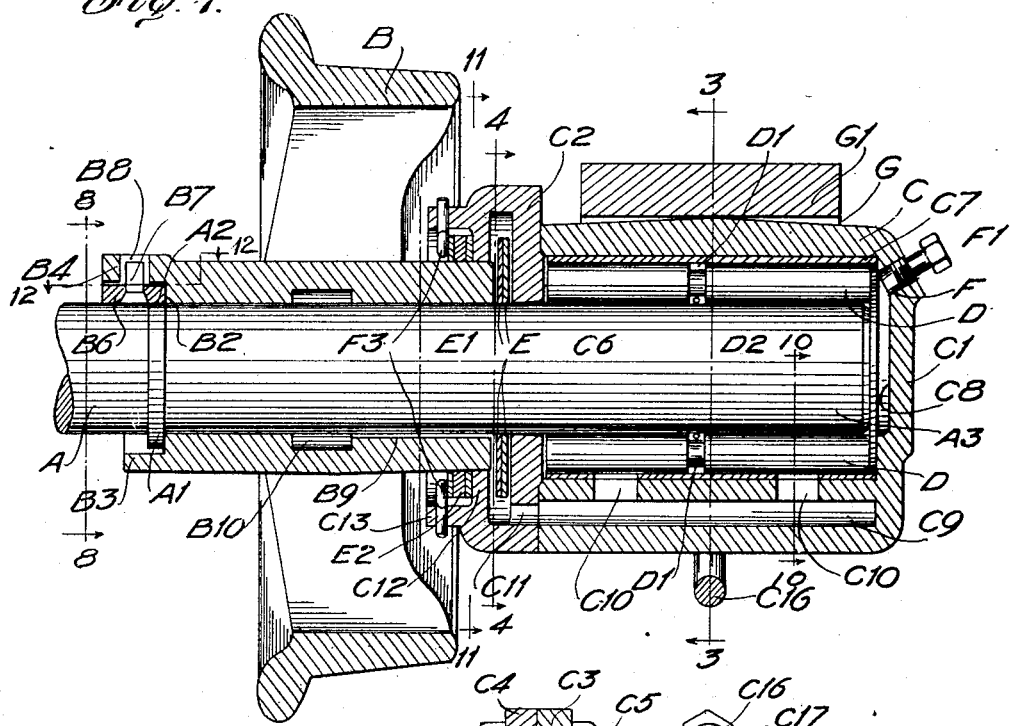
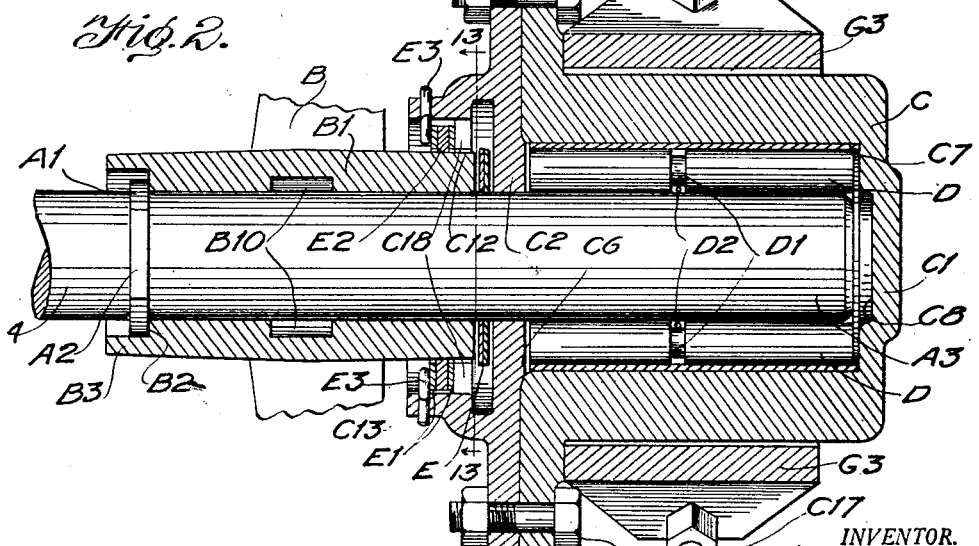

Dec. 1, 1931. H. W. SANFORD ET AL 1,834,035
JOURNAL BOX AND AXLE
Original Filed April 27, 1927  4 Sheets-Sheet 3
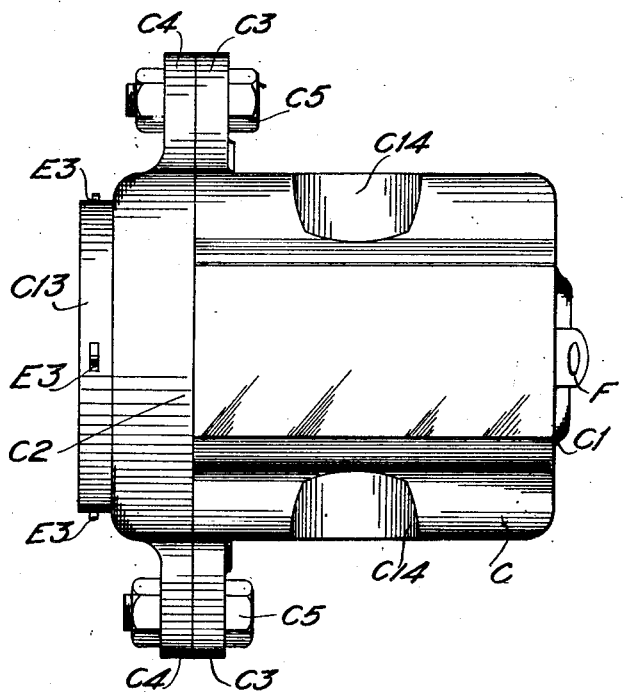
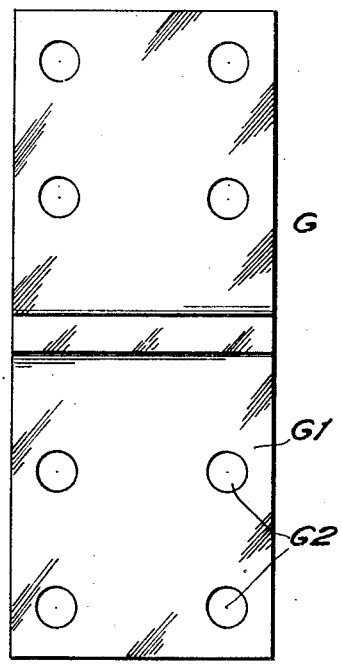
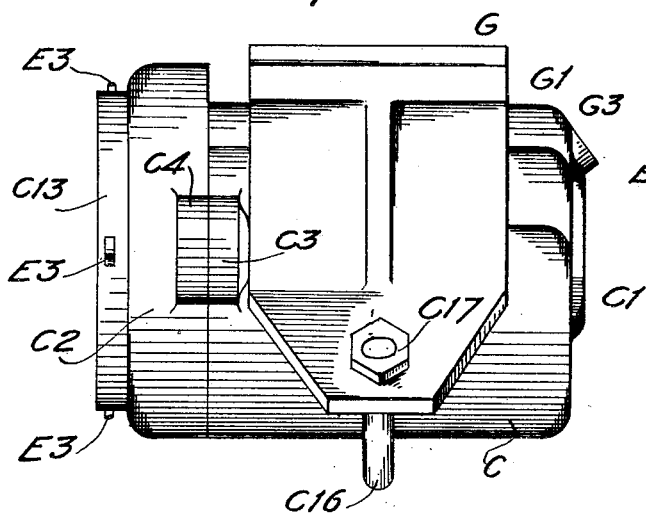
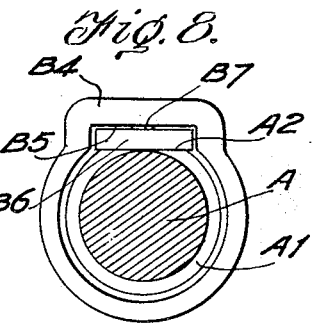
INVENTOR,
Hugh W. Sanford
BY Harry W. Jones
Cyrus Keller
ATTORNEYS.

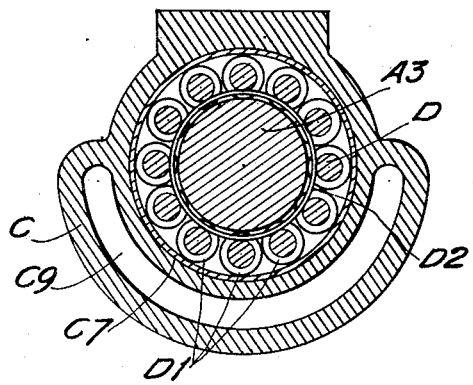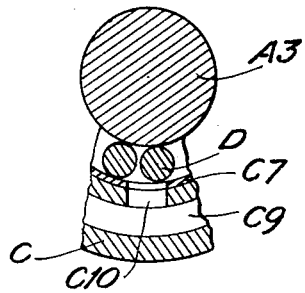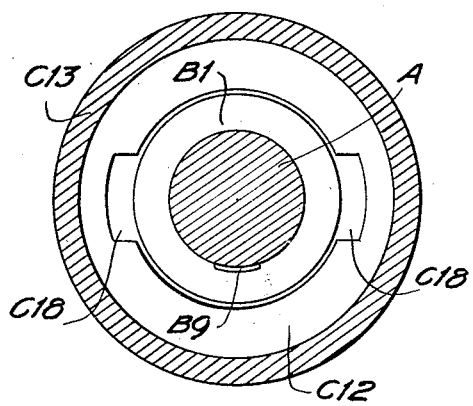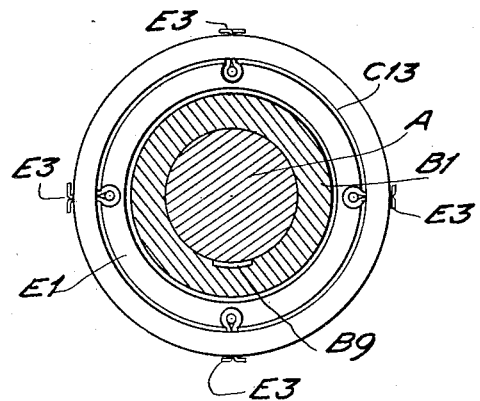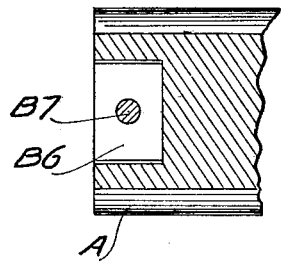

Patented Dec. 1, 1931

1,834,035

UNITED STATES PATENT OFFICE

HUGH W. SANFORD AND HARRY W. JONES, OF KNOXVILLE, TENNESSEE, ASSIGNORS TO SANFORD INVESTMENT COMPANY, OF WILMINGTON, DELAWARE, A CORPORATION OF DELAWARE

JOURNAL BOX AND AXLE

Original application filed April 27, 1927, Serial No. 186,959. Divided and this application filed March 29, 1928. Serial No. 265,649.

This invention relates to journal boxes and axles for mine cars and similar cars in which the track wheels surround the axle between the bearings which support the car body. The bearing is of the self-aligning type.

The object of the invention is to provide a structure which allows economical manufacture and easy assembling and separation of the parts and provides good control of end thrust and also provides good lubrication.

This application is a division of our application Serial Number 186,959, filed April 27, 1927, for Letters Patent for an improvement in journal boxes and axles.

In the accompanying drawings,

Fig. 1 is an upright view on the axial line of the structure;

Fig. 2 is a horizontal section on the same axial line;

Fig. 5 is a plan of the bearing box;

Fig. 6 is a plan of the pedestal;

Fig. 7 is a side elevation of the box and pedestal with the bolts omitted to show the bearing of the box on the inner edges of the pedestal legs;

Fig. 8 is an upright section on the line, 8—8, of Fig. 1, looking toward the right;

Fig. 9 is an upright section on the line, 9—9, of Fig. 1, looking toward the right;

Fig. 10 is an upright section on the line, 10—10, of Fig. 1, looking toward the right;

Fig. 11 is an upright section on the line, 11—11, of Fig. 1, looking toward the right;

Fig. 12 is a horizontal section on the line, 12—12, of Fig. 1;

Fig. 13 is an upright section on the line, 13—13, of Fig. 2, looking toward the left.

Figure 3:
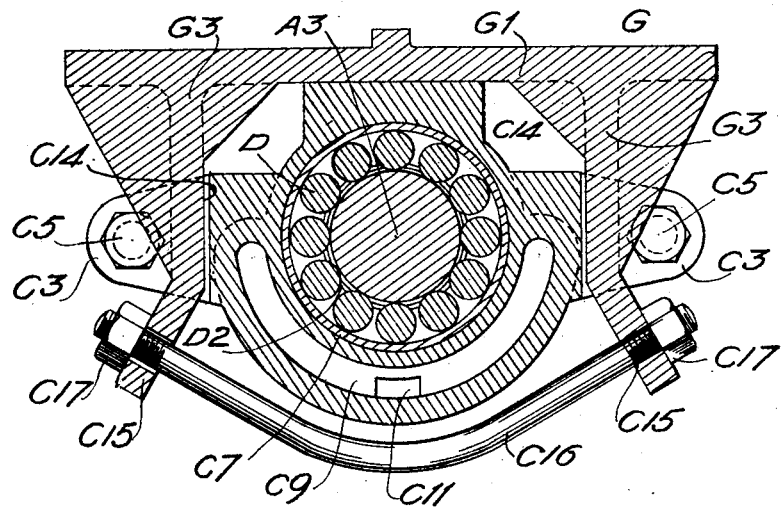
Fig. 3 is an upright section on the line, 3—3, of Fig. 1, looking toward the left.

Referring to said drawings, A is the axle of ordinary form, the part shown being cylindrical. A3 is the journal. Between the journal and the body of the axle is the circumferential flange, A1. The upper part of this flange is cut away horizontally to make a horizontal face, A2, to receive a key as will be described further on.

B is the wheel having a hub, B1, surrounding the journal and having a shoulder, B2, adapted to bear against the outer transverse face of the flange, A1.

The hub has a flange, B3, extending inward over and beyond the flange, A1. The hub flange has a lateral extension, B4, on which is an inner face, B5, far enough from the axle to receive a key, B6, between the axle and the face, A2. On the key is a pin or stud, B7, extending outward radially to the axle into the socket, B8, formed in the extension, B4, of the flange, B3. It will be observed that when this key is in position, it will bear on the face, A2, formed by cutting away the flange, A1, and thus hold the hub from turning on the axle, whereby the wheel is made "fast" on the journal. When this key and pin are absent, the wheel is "loose"—free to turn on the journal. When the key and pin are in position and the journal is free from the axle box and pedestal, the wheel may be moved outward on the journal, the key sliding on the face, A2, and on the journal. When the wheel has been removed from the journal, the key and pin may be removed from the hub. Then the wheel may be returned to its position to be "loose". This provision for rendering the wheel "fast" or "loose" is made because some operators of cars having the bearings distinct from the wheels prefer to have one wheel free to turn on the axle, particularly when the tracks on which the cars are used have curves. Then while traversing curves the wheels may turn independently of each other.

The part of the journal which extends outward beyond the wheel hub is surrounded by the bearing box, C. This box has an end wall, C1, extending over the end of the journal. The inner end of said box is closed by a cap, C2, which surrounds the journal and also the adjacent end of the hub B1. The cap has at each side of the structure a lateral ear, C4, which bears against a similar ear, C3, seated on the body of the bearing box. A bolt, C5, extends through the ears to bind them firmly to each other. The interior of the body of the box, C, is cylindrical. The cap, C2, has an annular shoulder, C6, extending into the body of the box, C, and bearing against the inner face of said box. The engagement thus made tends to prevent the cap from moving transversely on the end of the body of the box, C. The interior of the box is faced with a steel lining, C7. Between said lining and the journal are rollers, D, the ends of which may bear against the inner face of the wall, C1, and against the adjacent face of the cap, C2. The rollers are preferably made a little shorter than the space between said faces, in order that the rollers may rotate without being engaged by those faces. Approximately midway between their ends, the rollers have a circumferential groove, D1. A ring, D2, surrounds the journal, A3, within those grooves. As will appear further on, this ring serves to keep the rollers within the bearing box when the box is removed from the journal.

Opposite the end of the journal, the wall, C1 is provided with a recess, C8, in order that when there is end thrust that can be taken by the washers, E, and the cap, C2.

In the lower part of the bearing box is a reservoir, C9, formed by chambering the lower half of the wall of the box. Two ports, C10, afford communication between the reservoir and the interior of the box. A port, C11, allows passing of lubricant from the reservoir through the cap, C2. An annular upright flange, C12, forms a part of the cap and extends close to the hub, B1, there being a space between said flange and the main wall of the cap. A horizontal annular flange, C13, also surrounds the hub, but this flange is spaced from the hub far enough to receive between that flange and the hub two metal washers, E1, and a felt or similar packing washer, E2, between the washers, E1. Four cotters, E3, extend through the flange, C13, back of the washers, E1 and E2, and hold said washers against the flange, C12. Said washers, particularly the felt washer, E2, are made to fit to the hub sufficiently close to prevent the passing of oil or dust.

Figure 4:
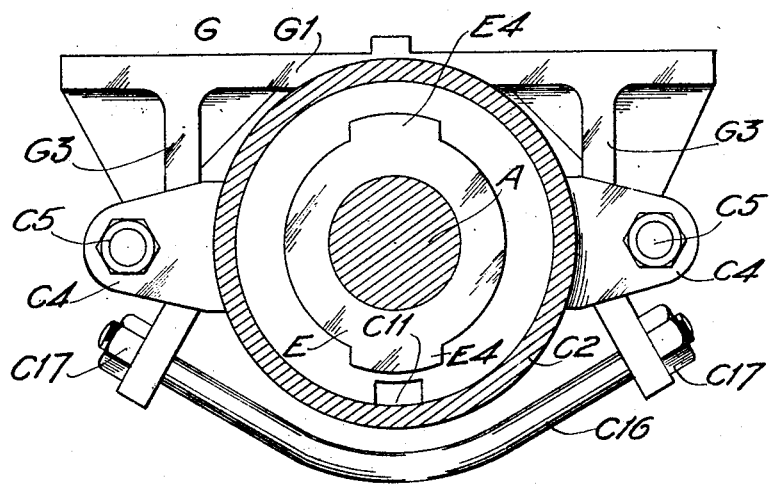
Fig. 4 is an upright section an the line, 4—4, of Fig. 1, looking toward the right.

In the space enclosed by the flange, C12, and the end of the hub and the main wall of the cap are two larger washers, E, which are thinner than the space between the end of the hub and the cap wall and are loose on the journal, so that said washers are free to turn on the journal by the occasional frictional engagement between the washers and the journal and the end of the hub. These washers are free from each other. Hence each may rotate independently of the other. Each washer, E, has a radial wing, E4. (Fig. 4.)

In the upper part of the wall, C1, of the axle box is a port, F1, in which is seated a removable closing member, F, which may be a grease screw in which is a spring-controlled ball valve of well-known form.

The interior of the hub is provided with a channel, B10, extending entirely around the hub to form a lubricant reservoir. A horizontal groove, B9, is formed in the interior face of the hub from the reservoir, B10, to the outer end of the hub and the washers, E.

Lubricant introduced through the port, F1, is received into the space between the end of the journal, A3, and the adjacent part of the wall, C1. Thence the lubricant moves by gravity into the space between the rollers, D, and along the length of the rollers, and some of the lubricant is then carried with the rollers in their movement around the journal. Some of the lubricant passes downward through the port, C10, into the reservoir, C9, and thence through the port, C11, to the washers, E, and into the space between the flange, C12, and the main wall of the cap, C2. It is preferable to introduce enough lubricant to cause the filling of all or the greater part of the reservoir, C9. This will effect immersing the lower rollers, D, in the lubricant and will cause the lubricant to rise along the washers, E, to the height of the lower part of the journal and thence through the groove, B9, into the reservoir, B10, of the hub. The washers, E1 and E2, are intended to substantially prevent the escaping of oil between the cap and the hub. The rotation of the washers, E, in unison or independently of each other will cause those washers to carry oil upward and distribute the oil over all the faces of said washers. This action is aided by the wings, E4. Thus these washers will be subjected to a minimum of friction through contact with each other and with the end of the hub and with the adjacent face of the main wall of the cap. When there is end thrust tending to move the journal, A3, and the wheel, B, outward on the car body, the hub, B1, will press the large washers, E, against the main wall of the cap. Under that condition, lubrication of the faces of the washers, E, is needed to reduce friction between the meeting faces of the washers and between the right hand washer and the main wall of the cap and between the left hand washer and the end of the hub.

From approximately midway between the cap, C2, and the end wall, C1, of the axle box, the upper face of said box is horizontal in cross section and is slanted downward toward the right and toward the left.

This raised middle part of the axle box supports the pedestal, G, by contact with the lower face of the horizontal plate, G1, of the pedestal. The plate, G1, is secured to the car body (not shown) in the usual manner by bolts extending through the bolt holes, G2. From the plate, G1, arms, G3, extend downward at each side of the axle box in position to bear against the side of the axle box and against the ears, C3. To increase the contact between these arms and the axle box, each side of the axle box is provided with an upright bearing face, C14. The ears serve as abutments for the pedestal arms.

Below said faces, C14, the arms are turned laterally away from each other and each is provided with an aperture, C15, which receive the ends of a stirrup rod, C16. Each end of said rod extends through the adjacent aperture and receives a nut, C17. The stirrup rod, C16, is spaced far enough from the lower face of the axle box to allow downward movement of the axle box or upward movement of the pedestal when the car is passing over irregularities in the rail track. During movement of the car, the pedestal may rock on the summit of the upper face of the axle box for maintaining the alignment of the axle box and the axle and the rollers, D, in the manner already known in this art.

It has already been stated that thrust by movement of the axle box toward the wheel hub is taken by the cap, C2, and the end of the hub and the washers, E. Thrust in the other direction is taken by the arms, G3 and the axle box ears, C3.

When it is desired to remove the axle box, the stirrup rod, C16, is removed from the pedestal arms, G3. Then that part of the car body is raised until the pedestal arms are above the ears, C3 and C4. When that has been done, the axle box is free to be drawn outward along and off from the journal. If the wheel is to be removed, that part of the car is to be raised sufficiently to allow the wheel to clear the pedestal arms.

The metal washers, E1, and the packing washer, E2, may be inserted and removed when the cotters, E3, have been removed.

The washers, E, are to be inserted and removed through the flanges, C12 and C13, the wings, E4, of said washers passing through the notches, C18, in the flange, C12. (Figs. 2 and 13).

We claim as our invention:

1. In a structure of the kind described, the combination of a journal, a hub having an interior lubricant space and a groove leading from said space to the outer end of the hub, and an axle box comprising a cap having a transverse flange extending around the hub and spaced from the body of the cap to form a recess communicating with said groove and said cap having a port communicating with the interior of the axle box.

2. In a structure of the kind described, the combination of a journal, a hub having an interior lubricant space and a groove leading from said space to the outer end of the hub, an axle box comprising a cap having a transverse flange extending around the hub and spaced from the body of the cap to form a recess communicating with said groove and said cap having a port communicating with the interior of the axle box, and packing between said flange and the hub.

3. In a structure of the kind described, the combination of a journal, a hub having an interior lubricant space and a groove leading from said space to the outer end of the hub, an axle box comprising a cap having a transverse flange extending around the hub and spaced from the body of the cap to form a recess communicating with said groove and said cap having a port communicating with the interior of the axle box, and a free washer surrounding the journal in said cap recess.

4. In a structure of the kind described, the combination with a journal, of a wheel surrounding said journal, an axle box extending around and across the end of said journal and surrounding the adjacent inner end of the hub of the wheel, rollers surrounding the journal within the axle box, the interior of the wall of the axle box opposite the end of the journal being recessed, an inlet port on said end wall, a lubricant reservoir or chamber in the lower part of the axle box and under the roller space and the part of the axle box wall above the reservoir having a port communicating with said reservoir and the space in which the rollers travel.

5. In a structure of the kind described, the combination with a journal, of an axle box extending around and across the end of said journal, rollers surrounding the journal within the axle box, the interior of the wall of the axle box opposite the end of the journal being recessed, an inlet port on said end wall, a lubricant reservoir or chamber in the lower part of the axle box and under the roller space and the part of the axle box wall above the reservoir having a port communicating said said reservoir and the roller space, and the axle box comprising a chambered cap surrounding the journal and in which cap is a port communicating with said reservoir.

6. In a structure of the kind described, the combination of a journal, a wheel surrounding said journal, an axle box surrounding the journal and extending around and across the outer end of the journal and surrounding the adjacent end of the hub of the wheel, and having in its lower part and under the roller space a lubricant reservoir and a port leading from said reservoir upward into the roller space.

7. In a structure of the kind described, the combination of a journal, an axle box surrounding the outer part of the journal and having in its lower part and under the roller space a lubricant reservoir and a port leading from said reservoir into the body of the roller space and the axle box having a chambered cap in which is a low port communicating with said reservoir.

8. In a structure of the kind described, the combination with a journal, of an axle box extending around and across the end of said journal and having in its outer part a lubricant inlet and having in its lower part and under the roller space a lubricant reservoir and having a port between said reservoir and the roller space and the axle box comprising a chambered cap surrounding the journal and in which cap is a low port communicating with said reservoir.

In testimony whereof I have signed my name, at Knoxville, Tennessee, this 23rd day of March, in the year one thousand nine hundred and twenty-eight.

HUGH W. SANFORD.

In testimony whereof I have signed my name at St. Louis, Missouri, this 19th day of March, 1928.

HARRY W. JONES.